March 21, 1944.    H. O. LINDGREN    2,344,888
CENTRIFUGAL SEPARATOR
Filed Sept. 23, 1941    3 Sheets-Sheet 1

INVENTOR
Hans Olof Lindgren
BY
Busser and Harding
ATTORNEYS.

WITNESS:

March 21, 1944. H. O. LINDGREN 2,344,888
CENTRIFUGAL SEPARATOR
Filed Sept. 23, 1941 3 Sheets-Sheet 2
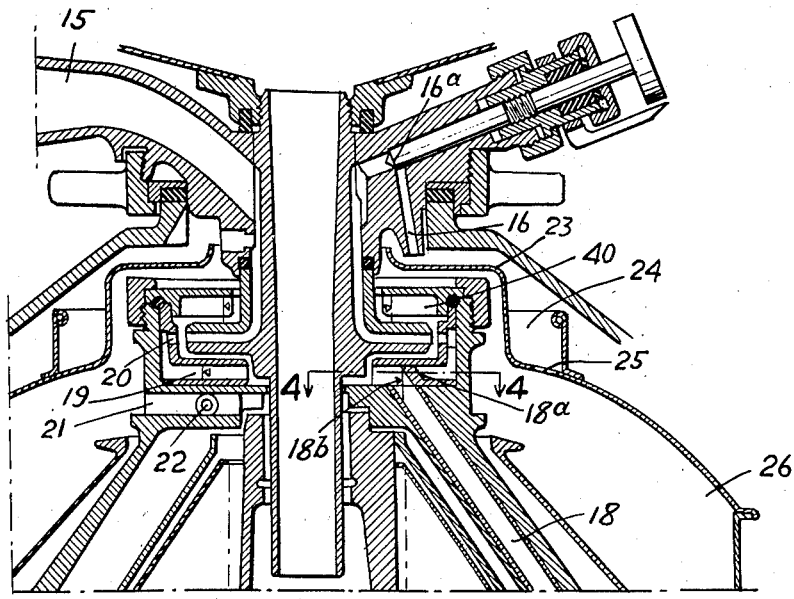
FIG. 3.
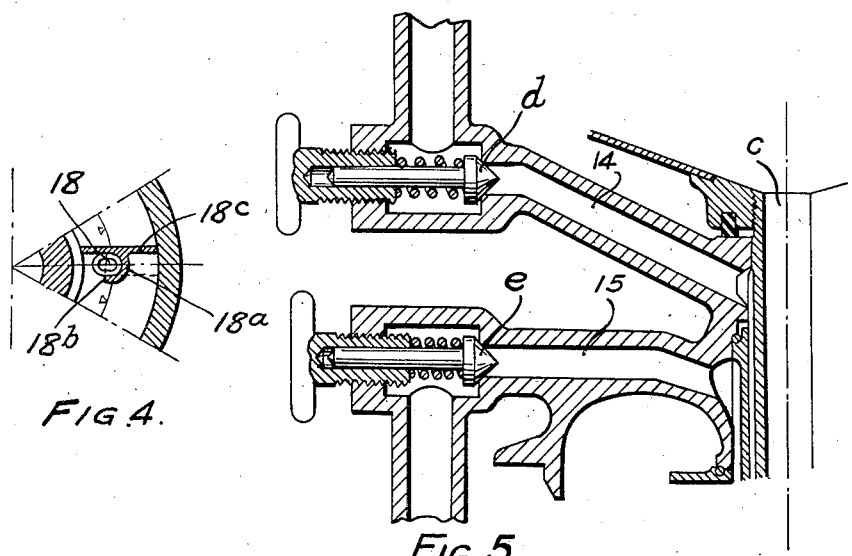
FIG. 4.
FIG. 5.
INVENTOR
Hans Olof Lindgren
BY
Busser and Harding
ATTORNEYS.
WITNESS:

March 21, 1944.  H. O. LINDGREN  2,344,888
CENTRIFUGAL SEPARATOR
Filed Sept. 23, 1941  3 Sheets-Sheet 3

INVENTOR
Hans Olof Lindgren
BY
Busser and Harding.
ATTORNEYS.

WITNESS:

Patented Mar. 21, 1944

2,344,888

UNITED STATES PATENT OFFICE 2,344,888

CENTRIFUGAL SEPARATOR

Hans Olof Lindgren, Appelviken, Sweden, assignor to The De Laval Separator Company, New York, N. Y., a corporation of New Jersey Application September 23, 1941, Serial No. 411,966
In Sweden October 5, 1940

12 Claims. (Cl. 233—21)

In centrifugal separators provided with paring devices for the cream and/or the skim milk it is common practice that one of the said paring devices communicates with the separating chamber in such a way that the inner surface of the cream layer can be displaced in the separating chamber by throttling the discharge pipe. In separators of this type the amount of cream is regulated by means of a cock arranged in the discharge pipe, advantageously in the discharge pipe for skim milk. However, when the cock communicates with the paring chamber which in turn communicates directly with the separating chamber, any changes in the resistance to the flow of the liquid which occur beyond the bowl during operation have an influence on the amount of cream.

The object of the invention is to provide, in the specified type of separators, an arrangement by means of which the variations in the amount of cream, due to changes in the resistance to the current occurring beyond the bowl, are avoided. According to the invention, this object is attained by providing a level overflow between the separating chamber and the paring chamber or chambers, and a pipe of communication provided with a regulating member between the cream and the skim milk discharge pipes. The level overflows, which may be regulated only when the bowl is at a standstill, prevent any influence from the outside on the quantity of liquid flowing into the paring chamber, while the said pipe of communication provided with a regulating member enables more or less cream to be discharged from the bowl, without possible changes in the resistance to the current in the pipes and apparatus coupled beyond the separator being able to influence the relation between the amounts of the two liquid components. The amount of cream discharging from the separator bowl is dependent on the regulation of the level overflow, and the latter should advantageously be so regulated that the bowl yields the thickest cream which it is desirable to obtain in a dairy. By means of the regulating arrangement between the said discharge pipes a fixed quality of skim milk may be transferred to the cream in case it is desirable to produce a thinner cream than the one for which the overflow between the separating chamber and the paring chamber is regulated.

The invention also covers the features of regulating the fat content of the cream in such a way that the discharge takes place without mixture of air with the liquids, it thereby being necessary to take into account the possibility that the hollow cylinders of liquid sometimes assume such a position in the paring chambers that the liquid does not sufficiently overlap the paring discs. The discharge pipes of the separator may, therefore, in a manner known per se, be provided with fixed or regulable throttles, in order that the liquid level in the paring chambers, separated from the separating chamber by the overflows, can assume such a position as to maintain the overlapping necessary for the froth-less discharge of the liquids. Generally, it is sufficient to use fixed throttling devices; but if the quantity of milk fed to the separator varies it may be advantageous to use regulable throttling devices, such as, for instance, ordinary regulating cocks. These may be manually adjustable cocks, but are preferably spring-loaded valves that will maintain uniform pressures in the two discharge passages. If only minor variations of the quantity of cream in relation to that of whole milk are allowable, valves may be provided in the skim milk part of the machine or in the cream pipe, which valves keep the pressures in the pipes uniform independent of the resistance to the current exerted therein. The valves should be arranged in the discharge pipes extending from the separator at points located between the apparatus coupled after the separator (which apparatus is subjected to the variations in the resistance to the current) and the connection provided by the pipe of communication hereinbefore described. The valves automatically maintain a constant pressure in the pipes extending from the separator and consequently also maintain a constant difference of pressure between the two points of connection of the said pipe of communication, so that the same always is passed by a constant amount of liquid which is independent of the variations in the resistance to the liquid currents in the apparatus coupled therebeyond.

The drawings illustrate, by way of example, two embodiments of the invention, the first of which, shown in Figs. 1 and 2, is provided with paring devices both for the skim milk and for the cream, the second of which, shown in Figs. 3 and 4, is provided with a paring device for only the skim milk.

Fig. 3 is a vertical section through the second named embodiment of the invention.

Fig. 4 is a horizontal section on the line 4—4 of Fig. 3.

Fig. 5 is a sectional view of the milk and cream discharge passages equipped with the spring loaded valves hereinbefore described.

Figure 2:
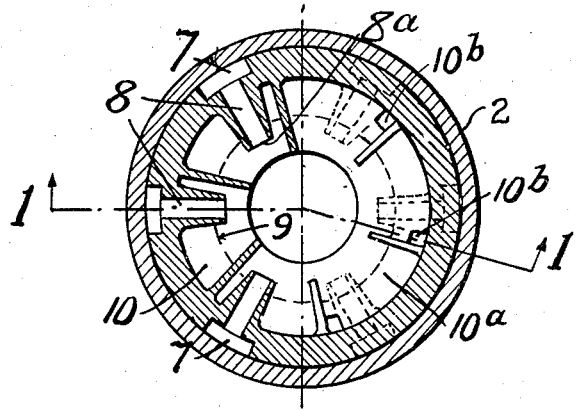
Fig. 2 is a horizontal section on the line 2—2 of Fig. 1.

The separating chamber $a$ of the centrifugal bowl 1 is preferably provided with the usual frusto-conical discs $b$ dividing the chamber into a multiplicity of thin laminae at an angle to the axis of rotation. The separating chamber being of a conventional type, only its upper part is shown. In the neck 2 of the separator bowl are two paring chambers 3 and 4, for the cream and the skim milk respectively, revolving with the bowl and provided with stationary paring discs 5 and 6. The separated skim milk flows from the peripheral part of the separating chamber $a$ through channels 7 and radial channels 8 into chambers 10 at some distance inside the level 9 of the liquid therein. Chambers 10 are separated from the paring chamber 4 by a horizontal wall 10$a$. At the open inner outflow end of each channel 8 a level overflow 8$a$ is thus formed in the plane of Fig. 2, so that the level of the liquid contained in chamber 4 can be displaced without influencing the pressure in channel 8 and consequently the pressure in the separating chamber. The chamber 10 communicates with the paring chamber 4 through openings 10$b$, provided in the wall 10$a$ close to the outer wall of the paring chamber. The arrangement of the openings 10$b$ enables a higher pressure in the discharge pipe than when the skim milk discharging over the level overflow directly enters the paring chamber 4, because the said wall 10$a$ and the openings 10$b$ prevent the paring disc 5 from having a braking effect on the skim milk flowing over the level overflow.

The cream enters the paring chamber 3 through a radially adjustable hollow screw 11, flowing from the central part of the separating chamber into the said screw over its inner rim, so that a level overflow exists also on the cream side. The highest liquid levels in the chambers 3 and 4 are bounded inwards by providing the chamber 4 with a level outlet 13 opening outwards, which outlet should be located on such a radius that the liquid escapes here as soon as or before the skim milk level 9 in chamber 10 reaches the orifice of the channel 8, so that also when the hollow cylinder of liquid is reduced the level overflow remains operative.

The two liquid components are discharged by stationary paring discs 5 and 6 through stationary channels 14 and 15. The parts of channels 14 and 15 nearest the parers are shown as annular passages surrounding a central tube $c$ through which the whole milk is fed to the centrifugal bowl. Channels 14 and 15 communicate by a pipe 16 in which a regulating valve 16$a$ is arranged. If, when the valve 16$a$ is open, the skim milk paring 6 produces a higher pressure than the cream paring disc 5, skim milk flows from channel 15 into cream channel 14. The cream screw 11 determines by its radial position the relation between the amount of cream and the amount of skim milk, that is, the thickness of the cream. The cream screw 11 should advantageously be adjusted to produce the thickest cream that is produced in the dairy. If the separator should give a thinner cream, the valve 16$a$ is more or less opened, so that a corresponding quantity of skim milk is again mixed with the cream.

In the arrangement according to the invention, the discharging quantity of cream is not changed when the pressure in the discharge pipes undergoes a change. However, the quantity of cream is unchanged only when the channel 16 by which the cream discharge pipe and the skim milk discharge pipe communicate is closed, that is, when the thickest cream is discharged. If now skim milk is fed into the cream, the amount of the skim milk is, of course, dependent on the difference of pressure existing between the two pipes 14 and 15 when the regulating members occupy a given position. If the said difference of pressure is changed, the amount of the skim milk flowing into the cream is also changed. Such a change is advantageously prevented by providing, in the discharge pipes 14 and 15 for the cream and the skim milk, valves $d$ and $e$, such as are referred to in the foregoing description, which maintain uniform super-atmospheric pressures in the said pipes and maintain a higher pressure in pipe 15 than in pipe 14.

Fig. 3 shows, by way of example, another embodiment of the invention in which only the skim milk is discharged by a paring disc, while the cream leaves the bowl freely. The skim milk is fed into the paring chamber 40 through a number of tubes 18 which open some way inside the level of the liquid into an annular chamber 19, which communicates with the paring chamber by openings 20. The orifices of the tubes 18 are each covered by a vaulted wall 18$a$ the edges 18$b$ of which, extending parallel to the axis of rotation, forms a level overflow, which corresponds to the one formed at the orifices of the channels 8 in Fig. 2. Fig. 4 illustrates the construction of the vaulted wall 18$a$, which on the one side is continued by the radial wall 18$c$ and on the other side is provided with the overflow edge 18$b$ located in radial direction. The cream discharges through a channel 21 which may be more or less throttled by a regulating screw 22. In this embodiment, also, the screw 22 should be adjusted to yield the thickest cream which it is desirable to produce in the dairy. If necessary, the cream concentration is regulated by mixing the cream with a corresponding quantity of skim milk through the regulating valve 16. The skim milk discharges over the cover 23 and is collected in the annular pocket 24 of the cover, whence it flows through openings 25 into the cream collecting chamber 26.

Figure 1:
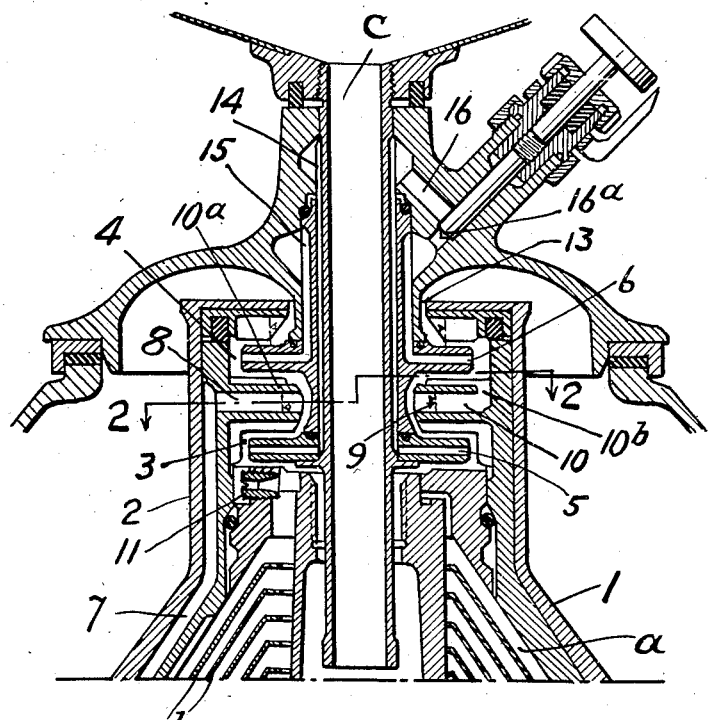
Fig. 1 is a vertical section, on the line 1—1 of Fig. 2, of the first named embodiment of the invention.
Figure 7:
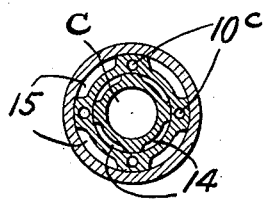
Fig. 7 is a horizontal section on the line 7—7 of Fig. 6.
Figure 6:
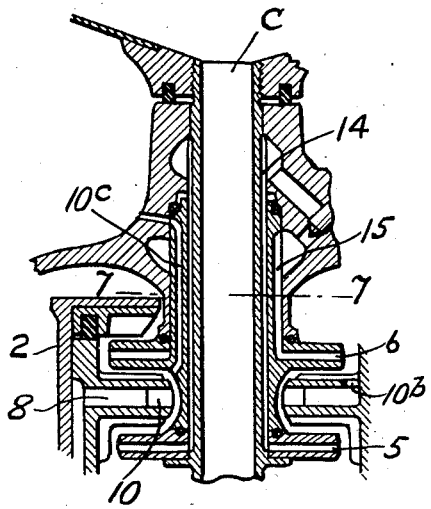
Fig. 6 is a vertical section of a part of the embodiment of the invention shown in Fig. 1, slightly modified.
Figure 8:
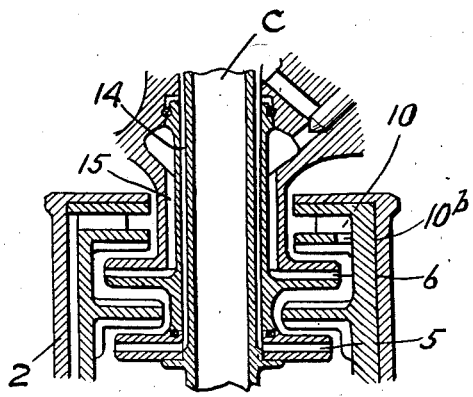
Fig. 8 is a vertical section of another modification of a part of the embodiment of the invention shown in Fig. 1.

With the regulating device according to the invention the air-free discharge hereinbefore referred to may be jeopardized if a partial vacuum should form in the space of the chamber 10 inside the hollow cylinder of liquid between the paring discs 5 and 6 (in the embodiment illustrated in Fig. 1), due to the air contained in the said space being sucked away by the flow of liquid. The atmospheric pressure existing in the chamber 10 depends on various factors. In the embodiment illustrated in Fig. 1, it is, therefore, desirable that the chamber 10 should communicate with the atmosphere, which, for example, could be effected by means of a channel 10$c$ extending through the paring disc 6 and within the hub carrying the paring disc and opening into the atmosphere, as shown in Figs. 6 and 7. Air of atmospheric pressure then acts on the liquid level on both sides of the paring disc 6; thereby the skim milk would be mixed with a larger quantity of air and the formation of froth due thereto would also become more considerable than when only one side of the paring disc communicates with the atmosphere. If, however, the radial channels 8 with their level overflows and the chamber 10 are arranged above, instead of below, the paring disc 6 and paring chamber 4, as shown in Fig. 8, the paring chamber will always communicate with the atmosphere and the mixing with air, to which the liquid is subjected, is reduced. Channels extending through the paring disc 6 are then no longer required, and a vacuum may appear in the chamber between the paring discs without causing a harmful effect.

What I claim and desire to protect by Letters Patent is:

1. In a centrifugal separator, the combination with a separating chamber having closed outlet passages for cream and skim milk, means to maintain a constant ratio between the volumes of the two constituents and means to discharge them against a substantially super-atmospheric pressure, of means to cause uniform back pressure on both constituents with that on the skim milk uniformly higher than that on the cream, and a regulable by-pass from the skim milk passage to the cream passage.

2. In a centrifugal separator, the combination with a separating chamber having enclosed outlet passages for the lighter and heavier separated constituents, of means to insure that the pressure in one of said passages shall be higher than in the other, a controllable by-pass between said passages whereby a regulable portion of the liquid flowing thereinto shall be transferred from the higher pressure passage to the lower pressure passage and mixed with the liquid therein.

3. In a centrifugal separator, the combination with a separating chamber having enclosed outlets therefrom for the cream and skim milk and means in said outlets to cause both liquids to be dischargeable at super-atmospheric pressure, of throttling means to cause uniform super-atmospheric pressures in said outlets with that for the skim milk higher than that for the cream, and a regulable by-pass from the skim milk outlet to the cream outlet whereby skim milk can be caused to mix with rich cream to produce poorer cream.

4. A centrifugal separator comprising a rotatable separating chamber having discharge passages from the peripheral and central parts thereof, a paring chamber communicating with one of said passages, means providing a liquid level overflow in the last named passage, a stationary parer through which the liquid from the parer chamber is discharged, a discharge channel communicating with the stationary parer, a by-pass between said channel and the other of said passages, and a member adjustable to variably throttle said by-pass.

5. A centrifugal separator as defined in claim 4 including also members in said discharge channel and in the last named discharge passage, beyond said by-pass, adapted to regulate the discharge pressures therein.

6. A centrifugal separator comprising a rotatable separating chamber rotatable paring chambers communicating respectively with the peripheral and central portions of the separating chamber, means providing liquid level overflows between the separating chamber and the paring chambers, stationary parers through which the liquids from respective chambers are discharged, discharge passages communicating with the respective parers, a by-pass between said passages, and a member adjustable to variably throttle said by-pass.

7. A centrifugal separator as defined in claim 6 including also members in said discharge passages, beyond said by-pass, adapted to regulate the discharge pressures therein.

8. A centrifugal separator comprising a rotatable separating chamber, a skim milk outflow passage communicating with the peripheral part of the separating chamber, a cream discharge passage communicating with the central part of the separating chamber, a rotatable paring chamber, a rotatable feed chamber for the paring chamber, said skim milk outflow passage extending into said feed chamber and having a level overflow therein, there being an opening between said feed chamber and said parer chamber at a greater radial distance from the separator's axis of rotation than such overflow, a stationary paring member extending into said parer chamber, a skim milk discharge passage communicating with the parer member, and a regulable by-pass between said skim milk and cream discharge passages.

9. A centrifugal separator as defined in claim 8 comprising also means beyond said by-pass to maintain uniform pressures in said discharge passages.

10. In a centrifugal separator, the combination with a separating chamber in which the mixture to be separated is divided into a plurality of thin laminae at an angle to the axis of rotation, discharge passages leading respectively from the periphery and the center of the separating chamber, weirs one in each passage over which the discharged liquid must pass, rotating chambers, one beyond each weir and adapted to receive the liquid discharged thereover, a stationary member in each rotating chamber having an including surface that is generated by rotating a line in a plane passing through the axis, each member having a narrow peripheral inlet and an outlet passage, of pressure regulating devices, one in each outlet passage, and an adjustable channel from one to the other of the outlet passages at points between the stationary members and the pressure regulating devices whereby a controlled portion of liquid from one outlet passage can be caused to mix with that in the other outlet passage.

11. In a centrifugal separator, a separating chamber having discharge passages for cream and skim milk, means to maintain a constant ratio between the volumes of the two separated constituents so as to give a yield of cream of the highest desirable fat content, means to maintain a higher pressure in the skim milk passage than in the cream passage and a by-pass between said passages which is adjustable to allow a predetermined percentage of the discharging skim milk to flow from the skim milk passage to the cream passage and thereby obtain cream of any desirable fat content below that specified.

12. A centrifugal separator as defined in claim 11 comprising also a parer chamber and parer interposed in the skim milk discharge passage between the separating chamber and said by-pass.

HANS OLOF LINDGREN.